United States Patent
Bucknell et al.

(10) Patent No.: US 10,970,727 B2
(45) Date of Patent: Apr. 6, 2021

(54) VOICE ACTIVATED INVENTORY MANAGEMENT

(71) Applicant: INTERNATIONAL BUSINESS MACHINES CORPORATION, Armonk, NY (US)

(72) Inventors: Graham R. Bucknell, Frenchs Forest (AU); Ewan M. Scott, Sydney (AU); Nicholas A. Baldwin, Gladesville (AU); Patrick Wong, Sydney (AU)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 16/176,550

(22) Filed: Oct. 31, 2018

(65) Prior Publication Data

US 2020/0134643 A1 Apr. 30, 2020

(51) Int. Cl.
| | | |
|---|---|---|
| *G10L 15/00* | (2013.01) | |
| *G10L 15/18* | (2013.01) | |
| *G06Q 30/02* | (2012.01) | |
| *G06Q 10/08* | (2012.01) | |
| *G10L 15/30* | (2013.01) | |

(Continued)

(52) U.S. Cl.
CPC ....... *G06Q 30/0202* (2013.01); *G06Q 10/087* (2013.01); *G10L 15/18* (2013.01); *G10L 15/22* (2013.01); *G10L 15/30* (2013.01); *G10L 2015/088* (2013.01); *G10L 2015/223* (2013.01)

(58) Field of Classification Search
None
See application file for complete search history.

(56) References Cited

U.S. PATENT DOCUMENTS 7,819,315 B1 * 10/2010 Pienkos ................ G06Q 30/02
235/383
8,060,412 B2 * 11/2011 Rosenbaum ............ G10L 15/26
705/26.1

(Continued)

OTHER PUBLICATIONS

Mell et al., "The NIST Definition of Cloud Computing," National Institute of Standards and Technology, Sep. 2011, p. 1-3, Special Publication 800-145.

(Continued)

*Primary Examiner* — Satwant K Singh
(74) *Attorney, Agent, or Firm* — Rakesh Roy

(57) ABSTRACT

A method, computer system, and a computer program product for voice activated inventory management is provided. The present invention may include recording an audio feed of a customer product query from a customer and a staff response from a staff member. The present invention may then include identifying a product requested by the customer. The present invention may also include identifying an inventory status in the staff response. The present invention may also include determining that a negative inventory status trigger is detected in the identified inventory status associated with the identified product requested by the customer. The present invention may further include, in response to determining that the negative inventory status trigger is detected in the identified inventory status associated with the identified product requested by the customer, storing, in an inventory database, a plurality of customer query data associated with the identified product requested by the customer.

20 Claims, 5 Drawing Sheets

(51) Int. Cl.
*G10L 15/22* (2006.01)
*G10L 15/08* (2006.01)

(56) References Cited

U.S. PATENT DOCUMENTS

| | | | | |
|---|---|---|---|---|
| 9,092,651 | B2* | 7/2015 | Ching | G06Q 30/0185 |
| 9,147,212 | B2 | 9/2015 | Pettyjohn et al. | |
| 9,449,325 | B2* | 9/2016 | Ching | G06Q 30/0185 |
| 9,928,481 | B1 | 3/2018 | Russell et al. | |
| 9,928,531 | B2 | 3/2018 | McCarthy | |
| 10,130,232 | B2* | 11/2018 | Atchley | G05B 19/048 |
| 10,176,455 | B2 | 1/2019 | Jones et al. | |
| 10,508,010 | B2* | 12/2019 | High | G05D 1/0061 |
| 2010/0262517 | A1* | 10/2010 | Woods | G06Q 30/0603 |
| | | | | 705/26.1 |
| 2011/0087535 | A1* | 4/2011 | Yoshizawa | G06Q 20/20 |
| | | | | 705/14.26 |
| 2014/0019199 | A1 | 1/2014 | Appel et al. | |
| 2014/0279188 | A1* | 9/2014 | Powell | G06Q 30/0631 |
| | | | | 705/26.7 |
| 2016/0189092 | A1* | 6/2016 | George | G06Q 10/087 |
| | | | | 705/28 |
| 2017/0024806 | A1 | 1/2017 | High et al. | |

OTHER PUBLICATIONS

Silverman, "Move Over, Alexa: How Voice-Controlled IoT Will Change the Retail Store," Total Retail, Feb. 27, 2018, p. 1-5, Napco Media, https://www.mytotalretail.com/article/how-voice-controlled-iot-will-change-the-retail-store/, Accessed on Oct. 18, 2018.

\* cited by examiner

VOICE ACTIVATED INVENTORY MANAGEMENT

BACKGROUND

The present invention generally relates to the field of computing, and more particularly to inventory management.

With the continued move of commerce to digital platforms, merchandisers have a good source of data to make intelligent inventory management decisions. Search engine data (e.g., customer product queries) collected from a retailer website or other digital platform may be analyzed to predict the product needs and desires of the customers and may be used to fill inventory gaps when certain products are not sold or carried by the retailer. Unlike retailer websites or digital platforms, physical retail locations of merchandisers are unable to capture and meaningfully leverage such customer query data.

SUMMARY

Embodiments of the present invention disclose a method, computer system, and a computer program product for voice activated inventory management. The present invention may include recording an audio feed of a conversation between a customer and a staff member, wherein the recorded audio feed includes a customer product query from the customer and a staff response associated with the customer product query from the staff. The present invention may then include identifying a product requested by the customer in the customer product query. The present invention may also include identifying an inventory status in the staff response associated with the customer product query. The present invention may also include determining that a negative inventory status trigger is detected in the identified inventory status associated with the identified product requested by the customer. The present invention may further include, in response to determining that the negative inventory status trigger is detected in the identified inventory status associated with the identified product requested by the customer, storing, in an inventory database, a plurality of customer query data associated with the identified product requested by the customer.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
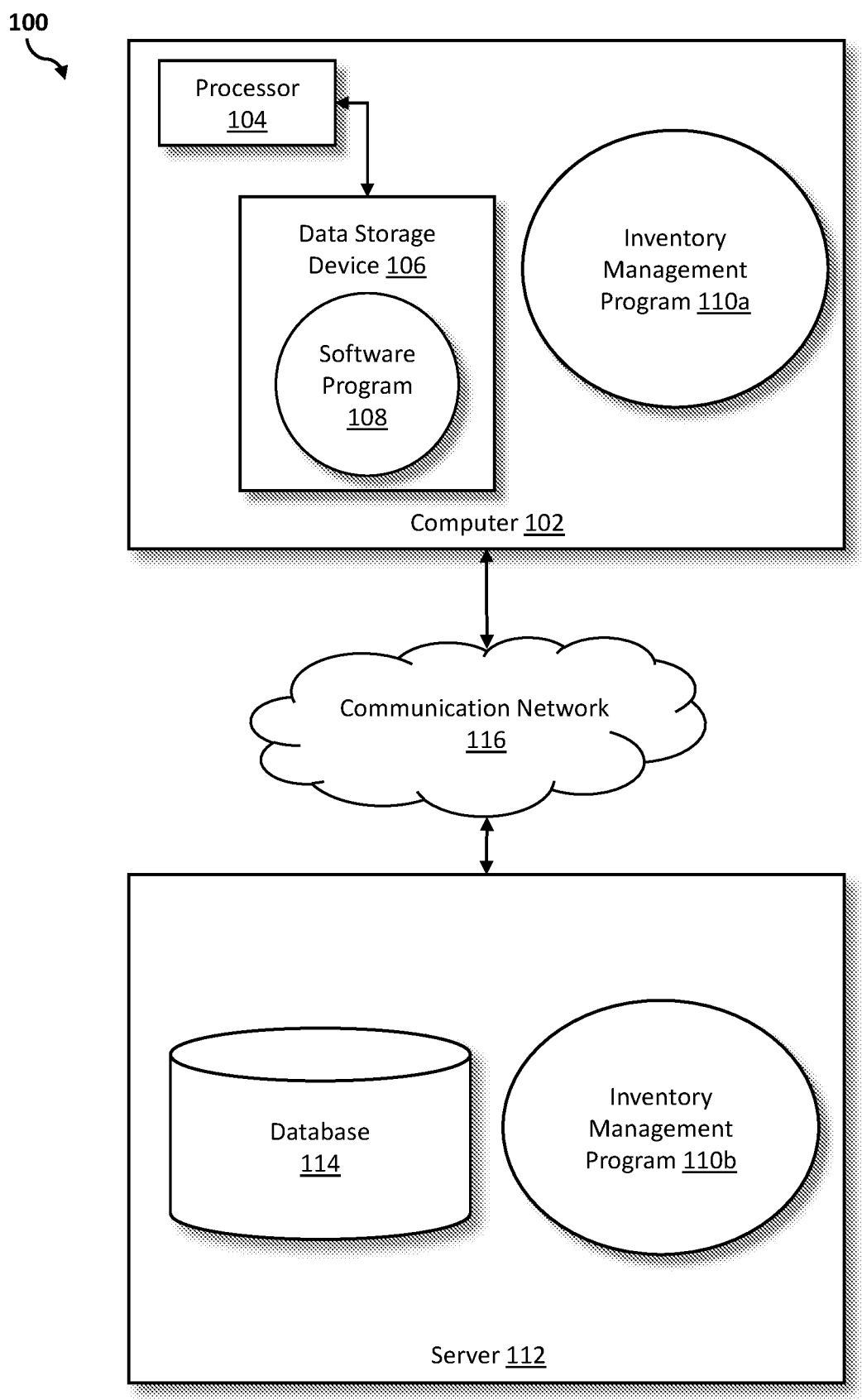
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for intelligent inventory management based on customer interactions in a physical retail location (e.g., retail store) of a merchandiser. As such, the present embodiment has the capacity to improve the technical field of inventory management by providing a user (e.g., merchandiser) with customer query data from a physical retail location for making intelligent retail inventory decisions. More specifically, an inventory management program may implement one or more voice recording devices in a physical retail location to capture interactions between a customer and staff working at the physical retail location. Then, the inventory management program may implement natural language processing to analyze the interactions between the customer and the staff to determine if a product is out of stock or is not sold by the merchandiser at the physical retail location. If a product is out of stock or is not sold by the merchandiser, the inventory management program may store one or more data/metadata associated with the customer interaction and the product in an inventory management database. The merchandiser may access the inventory management database to fill retail gaps by stocking the products that customers have requested at the physical retail location.

As previously described, with the continued move of commerce to digital platforms, merchandisers have a good source of data to make intelligent inventory management decisions. Search engine data (e.g., customer product queries) collected from a retailer website or other digital platform may be analyzed to predict the product needs and desires of the customers and may be used to fill inventory gaps when certain products are not sold or carried by the retailer. Unlike retailer websites or digital platforms, physical retail locations of merchandisers are unable to capture and meaningfully leverage such customer query data.

Therefore, it may be advantageous to, among other things, provide a way to capture the retail intelligence being lost in physical retail locations. It may be advantageous to implement natural language processing to analyze customer interactions with staff at physical retail locations to determine the products and items that customers may have requested, which may not be currently stocked by the merchandiser. It may be further advantageous for the merchandiser to learn of products that are currently not in the merchandiser's catalog of products, which, however, should be, based on customer product demands.

According to at least one embodiment, physical retail stores and/or retail staff may be provided with voice recording devices, such as smart microphones. The voice recording devices may constantly monitor the retail environment to detect a wake trigger (e.g., wake word and/or phrases that may indicate a customer query associated with a product) from a customer which may invoke a data collection event.

When the wake trigger is detected, the voice recording device may record the conversation or interaction between the customer and a retail staff. In one embodiment, the recorded interaction may be analyzed to determine when a specific product is out of stock. Based on the analysis of the recorded interaction, a merchandiser may be provided with the following information: customers in store X, require product Y, which is not currently stocked. In one embodiment, custom classifiers may be implemented for specific product types. As such, the inventory management program may inform the merchandiser that there is a demand for a similar, yet different product than the specific product carried by the physical retail location.

According to one embodiment, a wake word may be detected. In response, a microphone may record the customer query and the staff response. Then, the microphone may send the dialog to a remote natural language processing service. In one embodiment, the question may be analyzed for product names and the response may be analyzed for key phrases indicating lack of stock. If the response contains the lack of stock phrase, the product name and query metadata (e.g., store location, time of day) may be retained in a database. Thereafter, the database may be analyzed using one or more known techniques used for digital inventory management.

According to another embodiment, one or more kiosks may be implemented in physical retail stores in addition to a voice driven system. It is contemplated that customers may interact with the kiosks in addition to, or as an alternative to, interacting with retail staff. In one embodiment, similar customer query data may be collected from the customer interaction with the kiosk. In at least one embodiment, the retail staff may be instructed to record the specifics of a customer interaction into an inventory management system, after the customer interaction has happened. The voice driven system may provide for greater accuracy (as compared to manual input by retail staff) since all interactions may be recorded, not relying on the retail staff to remember to enter all the pertinent customer query data. The voice driven system may also decrease the cost of collecting the customer query data since the retail staff are not using work time for manually entering customer query data.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an inventory management program 110a. The networked computer environment 100 may also include a server 112 that is enabled to run an inventory management program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the inventory management program 110a, 110b may interact with a database 114 that may be embedded in various storage devices, such as, but not limited to a computer/mobile device 102, a networked server 112, or a cloud storage service.

According to the present embodiment, a user (e.g., merchandiser) using a client computer 102 or a server computer 112 may use the inventory management program 110a, 110b (respectively) to capture and analyze one or more interactions between a customer and retail staff at a physical retail location to determine if a product is out of stock or is not sold by the user at the physical retail location. The voice activated inventory management method is explained in more detail below with respect to FIG. 2.

Figure 2:
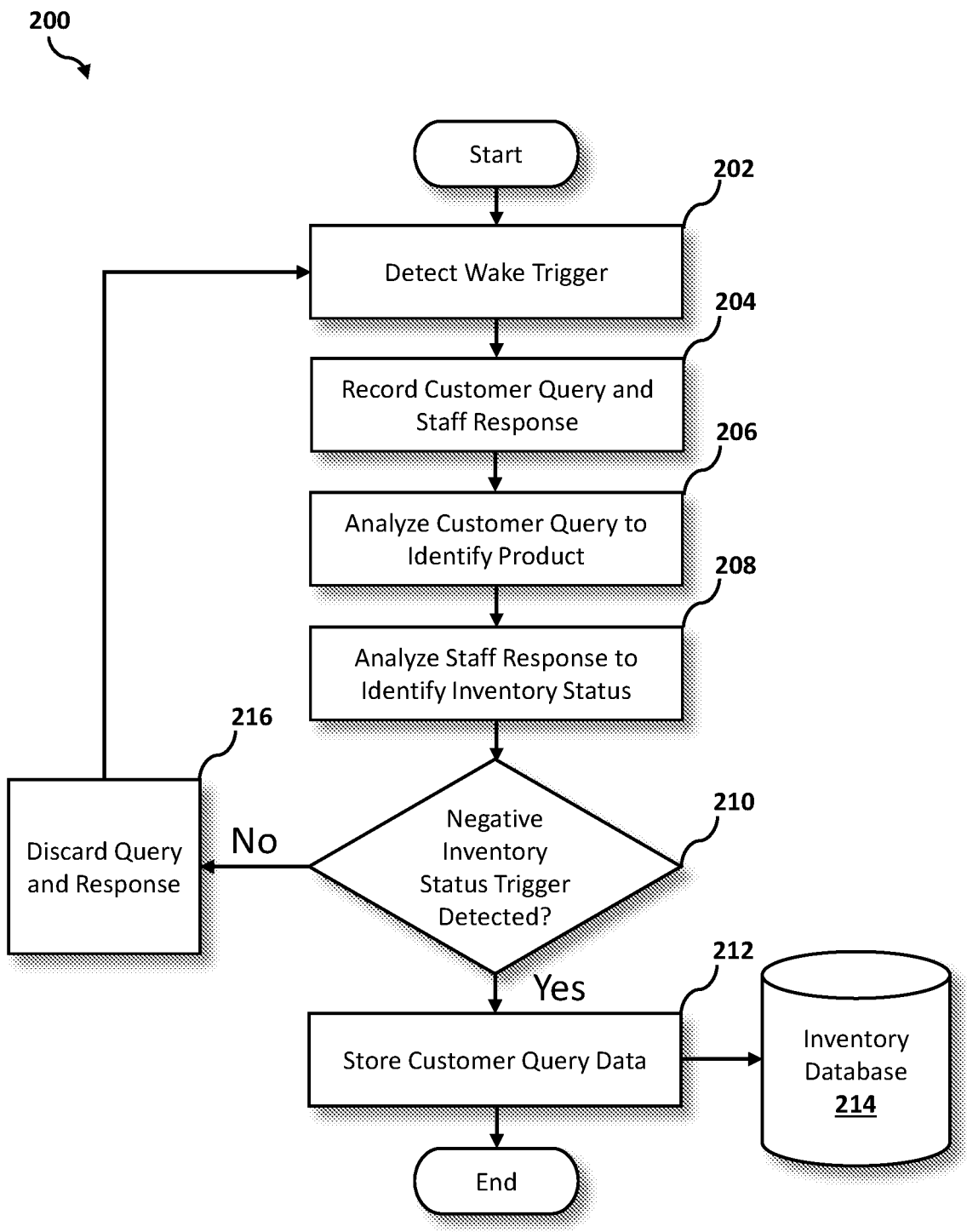
FIG. 2 is an operational flowchart illustrating a process for voice activated inventory management according to at least one embodiment.

Referring now to FIG. 2, an operational flowchart illustrating the exemplary voice activated inventory management process 200 used by the inventory management program 110a, 110b according to at least one embodiment is depicted.

At 202, a wake trigger is detected. A local system (e.g., client computer 102 or server computer 112) associated with a merchandiser (e.g., user) and operated at a physical retail location (e.g., a retail store) of the merchandiser may run the inventory management program 110a, 110b. The inventory management program 110a, 110b may interact (e.g., via communication network 116) with one or more voice recording devices (e.g., smart microphone) to monitor an audio environment of the physical retail location to detect a wake trigger (e.g., audible wake trigger) from a customer during an interaction or conversation between the customer and a retail staff member. The voice recording devices may be installed (e.g., affixed to the walls or ceiling) in the physical retail location and/or may be carried by the retail staff employed in the physical retail location. The inventory management program 110a, 110b may provide the wake trigger to include certain words and/or phrases configured to invoke a data collection event by the voice recording device. The voice recording device may receive the audio feed from customer interactions in the audio environment of the physical retail location and may be triggered to start or perform the data collection event when the audio feed a conversation between a customer and a retail staff member includes the wake trigger.

In one embodiment, the inventory management program 110a, 110b may provide multiple wake triggers for the voice recording device, including, yet not limited to the following: "I'm looking for a . . . "<product>; "can you tell me where the . . . "<product> is; and "I can't find the . . . "<product>. It is contemplated that the inventory management program 110a, 110b may also designate other similar phrases (e.g., indicative of a customer product query) as wake triggers for the voice recording device. In one embodiment, the inventory management program 110a, 110b may provide pre-defined wake triggers. In at least one embodiment, the inventory management program 110a, 110b may provide the user (e.g., merchandiser) with the option to designate user-defined wake triggers.

For example, a retail store X of a merchandiser operates a local system running the inventory management program 110a, 110b. The inventory management program 110a, 110b interacts, via communication network 116, with multiple smart microphones installed throughout the retail store X. The smart microphones constantly monitor the environment within the retail store X in order to detect one or more of the wake triggers provided by the inventory management program 110a, 110b. A customer in the retail store X starts a conversation with a retail staff member and asks, "can you tell me where the copper tee joints are?" The smart microphone closest to the customer and the retail staff member receives the audio feed of the conversation and the inventory management program 110a, 110b detects, via the smart microphone, the wake trigger, "can you tell me where the." In response to detecting the wake trigger, the inventory management program 110a, 110b invokes the smart microphone to perform the data collection event.

Then, at 204, the customer query and staff response is recorded. Once the wake trigger is detected, the inventory management program 110a, 110b implements the voice recording device to perform the data collection event. In one embodiment, as part of the data collection event, the inventory management program 110a, 110b may implement the voice recording device to start recording the audio feed of the conversation between the customer and the retail staff member (e.g., customer product query and staff response). The inventory management program 110a, 110b may instruct the voice recording device to record the audio feed of the interaction in any audio format (e.g., .wav format, .mp3 format, .wma format) suitable for natural language processing. In one embodiment, the data collection event may include capturing one or more customer query metadata associated with the interaction between the customer and the retail staff. The captured customer query metadata may be embedded in the recorded audio feed and may include the name/geographic location of the retail store, the time of the conversation between the customer and the retail staff member (e.g., a time stamp), and any other suitable information (e.g., name of store manager).

In one embodiment, the inventory management program 110a, 110b may receive (e.g., via communication network 116) the recorded audio feed (e.g., in a pre-defined audio format) of the interaction from the voice recording device to the local system operated by the physical retail location. The inventory management program 110a, 110b may provide a natural language processing component in the local system configured to analyze the recorded audio feed of the interaction between the customer and the retail staff. In at least one embodiment, the inventory management program 110a, 110b may interact (e.g., via communication network 116) with a remote natural language processing platform to analyze the recorded audio feed of the interaction between the customer and the retail staff. Accordingly, in at least one embodiment, the inventory management program 110a, 110b may implement the voice recording device to transmit (e.g., via communication network 116) the recorded audio feed (e.g., in a pre-defined audio format) of the interaction to the remote natural language processing platform for analysis.

Continuing with the previous example, when the customer in the retail store X asks the retail staff, "can you tell me where the copper tee joints are?" the inventory management program 110a, 110b receives the audio feed including the wake trigger, "can you tell me where the," via the smart microphone. In response, the inventory management program 110a, 110b performs the data collection event by implementing the smart microphone to start recording the customer product query and the retail staff response. In response to the customer product query, the retail staff responds, "sorry, we don't stock copper tee joints." The smart microphone records the audio feed of the conversation between the customer and the retail staff and transmits the recorded audio feed (in a .wav format), via communication network 116, to a remote natural language processing platform for analysis. Additionally, the recorded audio feed includes the customer query metadata embedded in the .wav audio file indicating that the interaction took place in retail store X located in New York on Jan. 1, 2018 at 10:05 AM eastern time.

Then, at 206, the customer query is analyzed to identify a product. In one embodiment, the inventory management program 110a, 110b may implement the natural language processing component in the local system to analyze the recorded audio feed of the interaction between the customer and retail staff. In another embodiment, the inventory management program 110a, 110b may interact with the remote natural language processing platform to analyze the recorded audio feed of the interaction between the customer and retail staff. The inventory management program 110a, 110b may implement the natural language processing component in the local system or the remote natural language processing platform to convert the recorded audio feed of the customer product query from the pre-defined audio format into a text format (e.g., .txt format, .doc format) using a speech-to-text mechanism. Thereafter, one or more known natural language processing mechanisms may be implemented to identify and extract one or more product names in the customer product query.

Continuing with the previous example, the inventory management program 110a, 110b implements the remote natural language processing platform to analyze the customer product query to identify a product name therein. Specifically, the recorded audio feed of the customer product query is converted using speech-to-text, from the audio .wav format to the text .txt format. Thereafter, one or more known natural language processing mechanisms is implemented to identify and extract the product, "copper tee joint," from the customer product query, "can you tell me where the copper tee joints are?"

Then, at 208, the staff response is analyzed to identify an inventory status. The inventory management program 110a, 110b may implement the natural language processing component in the local system or the remote natural language processing platform to analyze the retail staff response in a manner similar to the analysis of the customer product query at 206. Specifically, the inventory management program 110a, 110b may implement the natural language processing component in the local system or the remote natural language processing platform to convert the recorded audio feed of the retail staff response from the pre-defined audio format into a text format (e.g., .txt format, .doc format) using a speech-to-text mechanism. Thereafter, one or more known natural language processing mechanisms may be implemented to identify and extract key phrases indicating the inventory status (e.g., indicating lack of stock, indicating availability of stock) in the retail staff response.

Continuing with the previous example, the inventory management program 110a, 110b implements the remote natural language processing platform to analyze the retail staff response to determine the inventory status of the product sought by the customer. Specifically, the recorded audio feed of the retail staff response is converted using speech-to-text, from the audio .wav format to the text .txt format. Thereafter, one or more known natural language processing mechanisms is implemented to identify and extract the inventory status, "sorry, we don't stock," from the retail staff response, "sorry, we don't stock copper tee joints."

Then, at 210, an inquiry is made to determine if a negative inventory status trigger is detected. The negative inventory status trigger may include key words or phrases in the retail staff response indicating a lack of stock of a product. In one embodiment, the inventory management program 110a, 110b may provide multiple negative inventory status triggers, including, yet not limited to the following: "no we don't carry . . . "<product>; "unfortunately, we don't sell . . . "<product>; and "sorry, we don't stock . . . "<product>. It is contemplated that the inventory management program 110a, 110b may also designate other similar phrases (e.g., indicative of a lack of stock) as a negative inventory status trigger. In one embodiment, the inventory management program 110a, 110b may provide pre-defined negative inventory status triggers. In at least one embodiment, the inventory management program 110a, 110b may provide the user (e.g., merchandiser) with the option to designate user-defined negative inventory status triggers.

If the negative inventory status trigger is detected at 210, then the customer query data is stored at 212. The inventory management program 110a, 110b may determine that the negative inventory status trigger is detected if the retail staff response includes key words or phrases indicating the negative inventory status trigger (e.g., "sorry, we don't stock . . . " <product>) as noted above. Thereafter, the inventory management program 110a, 110b may transmit (e.g., via communication network 116) the customer query data (e.g., product name) and one or more customer query metadata associated with the customer query data to an inventory database 214 for storage. The customer query metadata stored in the inventory database 214 may include the customer query metadata embedded in the recorded audio feed including the name/location of the retail store, the time of the interaction (e.g., a time stamp), and any other suitable information (e.g., name of store manager). The inventory management program 110a, 110b may provide the inventory database 214 as part of the database 114 in server 112. In one embodiment, inventory management program 110a, 110b may store the customer query data/customer query metadata in the inventory database 214 as: "customers in store X, require product Y, that is not currently stocked."

The inventory management program 110a, 110b may provide the user (e.g., merchandiser) with access to the inventory database 214. The user may implement one or more existing digital inventory management techniques provided by the inventory management program 110a, 110b to analyze the inventory database 214. Accordingly, the inventory management program 110a, 110b may indicate, in the inventory database 214, the products that may need to be stocked or carried in the physical retail store location in order to meet the customer product requests identified in the physical retail store location of the merchandiser.

In one embodiment, the inventory management program 110a, 110b may transmit (e.g., via communication network 116) an alert to a user device (e.g., client computer 102) of the merchandiser indicating that one or more products may need be stocked or carried in the physical retail store location in order to meet the customer product requests identified in the physical retail store location. In at least one embodiment, the inventory management program 110a, 110b may transmit (e.g., via communication network 116) an alert to a distributor associated with the merchandiser indicating that the physical retail store location may need more inventory of an out of stock product and/or a low stock product.

Continuing with the previous example, based on the inventory status, "sorry, we don't stock," extracted from the retail staff response, "sorry, we don't stock copper tee joints," the inventory management program 110a, 110b determines that a negative inventory status trigger is detected at 210. Accordingly, the inventory management program 110a, 110b transmits the customer query data and the associated query metadata embedded in the recorded audio feed, via communication network 116, to the inventory database 214 for storage. Specifically, the inventory management program 110a, 110b transmits, via communication network 116, the following customer query data/metadata to the inventory database 214 for storage: "customer in retail store X (New York), requires copper tee joints, that is not currently stocked on Jan. 1, 2018 at 10:05 AM eastern time." The merchandiser associated with the retail store X determines from analysis of the inventory database 214 that customers have requested copper tee joints at the retail store X in New York, which are currently unavailable as of 10:05 AM eastern time on Jan. 1, 2018.

Additionally, the inventory management program 110a, 110b may provide custom classifiers (e.g., pre-defined by the user) for specific product types. As such, if the inventory management program 110a, 110b determines that there is a demand for a similar product that is different from the specific product carried in the physical retail store location, the inventory management program 110a, 110b may provide, in the inventory database 214, that there is a demand for a product that is similar, yet different from the specific product (with custom classifier) carried in the physical retail store location.

Continuing with the previous example, the inventory management program 110a, 110b analyzes the customer product query, "do you have a 5-millimeter-wide, 10-millimeter-long, pan head, marine plated screw?" The inventory management program 110a, 110b determines that the retail store X does not carry the requested hardware screw, however does stock a similar, shorter hardware screw (5-millimeter-wide, 8-millimeter-long, pan head, marine plated screw) with the other properties of the hardware screw being the same. The inventory management program 110a, 110b identifies, from the product catalog of retail store X, the customer classifier of the 5-millimeter-wide, 8-millimeter-long, pan head, marine plated screw as: "PH-MPS-5-8". Accordingly, the inventory management program 110a, 110b provides, in the inventory database 214, that there is a demand for a 5-millimeter-wide, 10-millimeter-long, pan head, marine plated screw, which is similar to the hardware screw "PH-MPS-5-8" currently stocked in retail store X.

In one embodiment, if a negative inventory status trigger is not detected at 210, then the customer product query and retail staff response is discarded at 216. The inventory management program 110a, 110b may determine that the negative inventory status trigger is not detected if the retail staff response includes key words or phrases indicating a positive inventory status trigger (e.g., availability of stock of a product). In one embodiment, the inventory management program 110a, 110b may provide multiple positive inventory status triggers, including, yet not limited to the following: "actually, we do carry . . . "<product>; "yes, we do sell . . . "<product>; and "look in the next aisle for . . . "<product>. It is contemplated that the inventory management program 110a, 110b may also designate other similar phrases (e.g., indicative of an availability of stock) as a positive inventory status trigger. In one embodiment, the inventory management program 110a, 110b may provide pre-defined positive inventory status triggers. In at least one embodiment, the inventory management program 110a, 110b may provide the user (e.g., merchandiser) with the option to designate user-defined positive inventory status triggers.

After the inventory management program 110a, 110b determines the positive inventory status trigger at 210 and discards the customer product query and retail staff response at 216, the inventory management program 110a, 110b may implement the voice recording device to continue monitoring the retail location to detect the next wake trigger at 202.

Continuing with the previous example, in response to the customer product query, "can you tell me where the copper tee joints are?", the retail staff member responds, "look in aisle 12 for the copper tee joints." The inventory management program 110a, 110b implements one or more known natural language processing mechanisms (at 208) to identify and extract the inventory status, "look in aisle 12," from the retail staff response, "look in aisle 12 for the copper tee joints." Based on the extracted inventory status, the inventory management program 110a, 110b determines that the inventory status is a positive inventory status trigger at 210 and discards the customer product query and retail staff response associated with the copper tee joints at 216. Thereafter, the inventory management program 110a, 110b returns to 202 and implements the smart microphone to continue monitoring the retail store X for the next wake trigger.

As described herein, the inventory management program 110a, 110b may provide a voice driven system for capturing customer interactions within physical retail locations and determining customer requested products and items that may be out of stock or may not be in the merchandiser product catalog. The inventory management program 110a, 110b may have the capacity to improve the technical field of inventory management by automatically linking the customer requested products and items, extracted from dialog with retail staff, to an inventory management system so that merchandisers may recognize customer demands and fill the retail gaps when certain products and items are not sold by the merchandisers. The inventory management program 110a, 110b may employ voice recording devices installed in physical retail locations to record the conversations between the customers and the retail staff. Thereafter, the inventory management program 110a, 110b may implement one or more natural language processing capabilities to identify customer requested products and items that may be unavailable at the physical retail locations. The inventory management program 110a, 110b may retain the identified customer requested products and items in an inventory database so that merchandisers may utilize the customer data to make intelligent inventory management decisions. Thus, the inventory management program 110a, 110b may improve the functionality of a computer.

It may be appreciated that FIG. 2 provides only an illustration of one embodiment and does not imply any limitations with regard to how different embodiments may be implemented. Many modifications to the depicted embodiment(s) may be made based on design and implementation requirements.

One other embodiment may include the inventory management program 110a, 110b implementing the voice recording device to record interactions between two or more customers if a wake trigger indicative of a customer product query is detected by the inventory management program 110a, 110b from at least one of the customers (e.g., "I wonder if they sell self-tapping screws"). Then, the inventory management program 110a, 110b may apply one or more natural language processing techniques to identify the requested product in the customer product query (e.g., self-tapping screws). Thereafter, the inventory management program 110a, 110b may search the merchandiser catalog of products to determine if the requested product is sold by the merchandiser. If the inventory management program 110a, 110b does not find the requested product in the merchandiser catalog of products, the inventory management program 110a, 110b may store the customer query data and the associated metadata in the inventory database 214.

One other embodiment may include the inventory management program 110a, 110b implementing the voice recording device to record interactions between a customer and a retail staff member if a wake trigger indicative of a customer product query is detected by the inventory management program 110a, 110b from the customer to the retail staff (e.g., "do you sell self-tapping screws?"). Then, the inventory management program 110a, 110b may apply one or more natural language processing techniques to identify the requested product in the customer product query (e.g., self-tapping screws). Thereafter, the inventory management program 110a, 110b may search the merchandiser catalog of products to determine if the requested product is sold by the merchandiser. If the retail staff member responds with a negative inventory status trigger (e.g., "sorry, we don't stock self-tapping screws"), yet the inventory management program 110a, 110b is able to find the requested product in the merchandiser catalog of products, the inventory management program 110a, 110b may not store the customer query data and the associated metadata in the inventory database 214. In at least one embodiment, the inventory management program 110a, 110b may transmit (e.g., via communication network 116) the location of the requested product (e.g., "look in aisle 12") to the retail staff member (e.g., via a retail staff device) if the retail staff member is unable to locate the requested product in the physical retail location. As such, the retail staff member may help the customer in finding the requested product.

Figure 3:
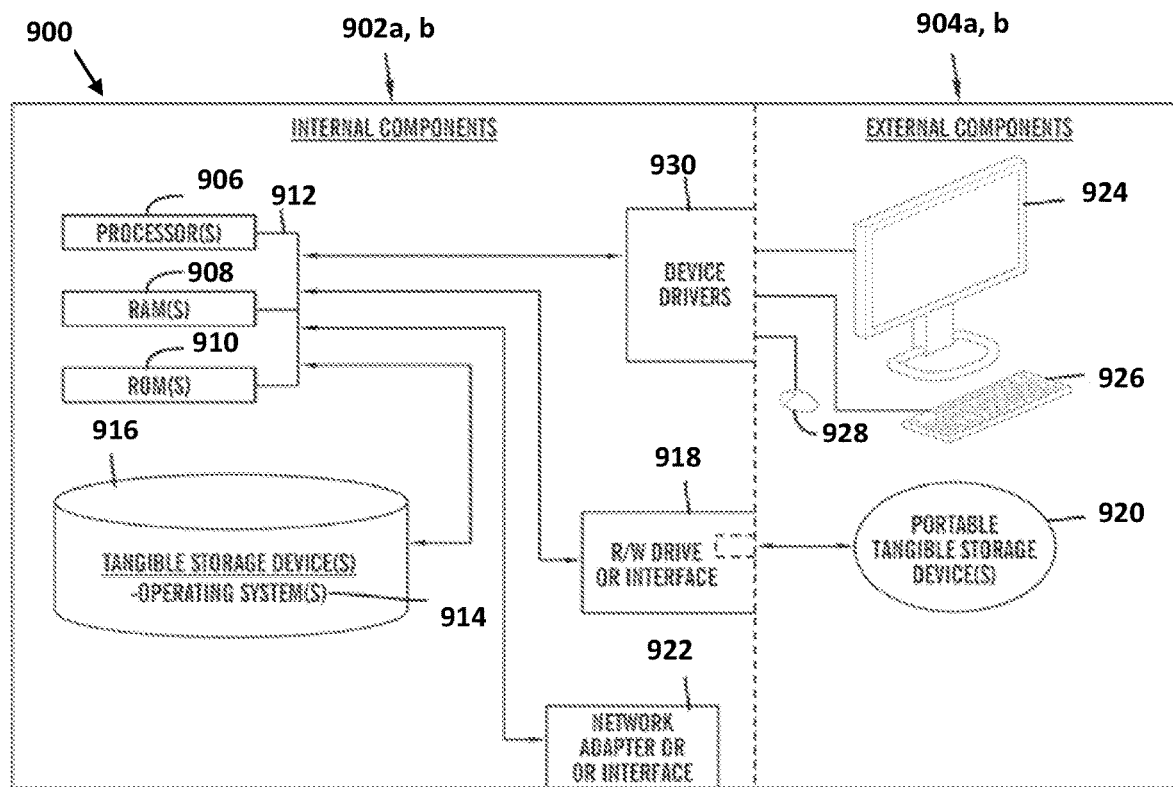
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the inventory management program 110a in client computer 102, and the inventory management program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the inventory management program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the inventory management program 110a in client computer 102 and the inventory management program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the inventory management program 110a in client computer 102 and the inventory management program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
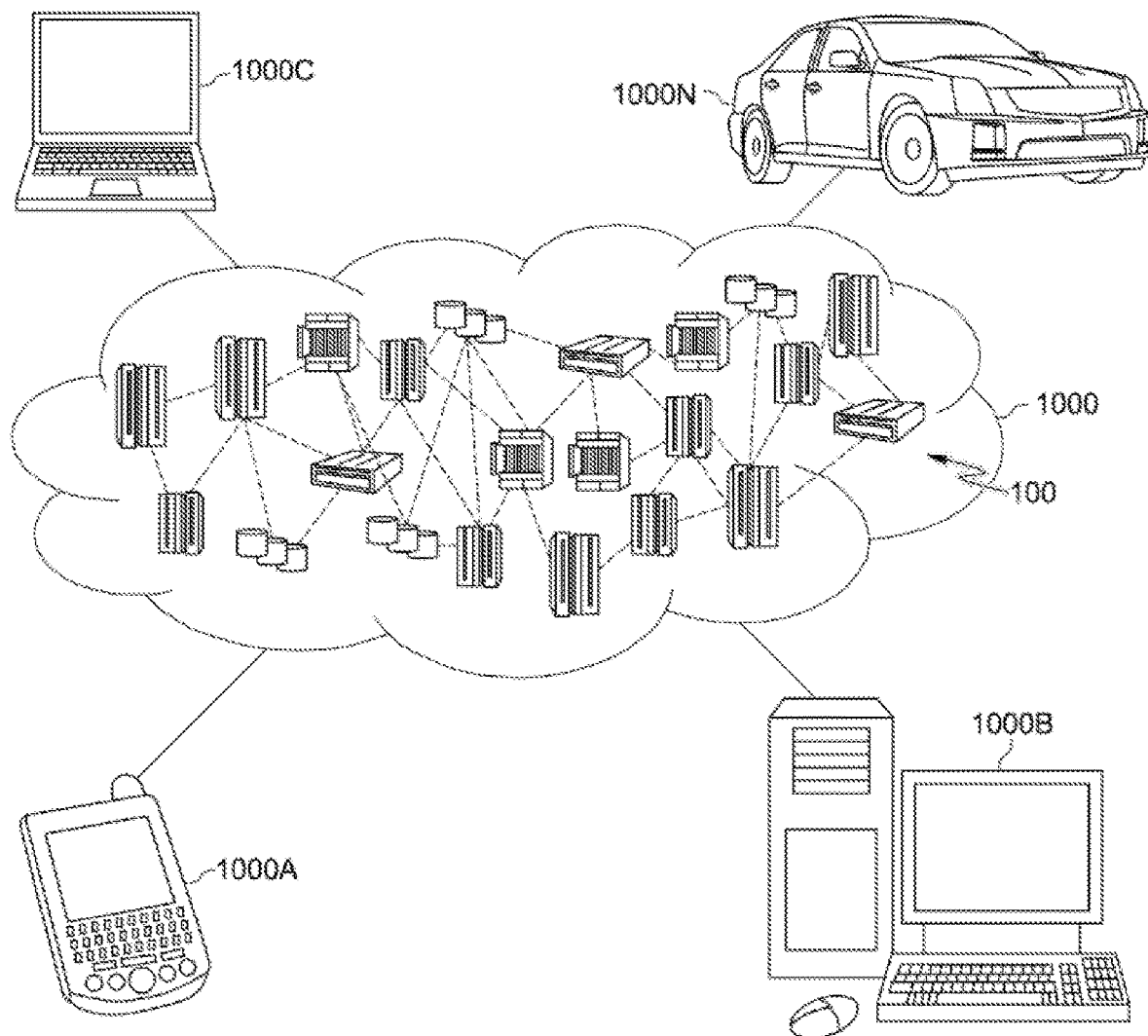
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
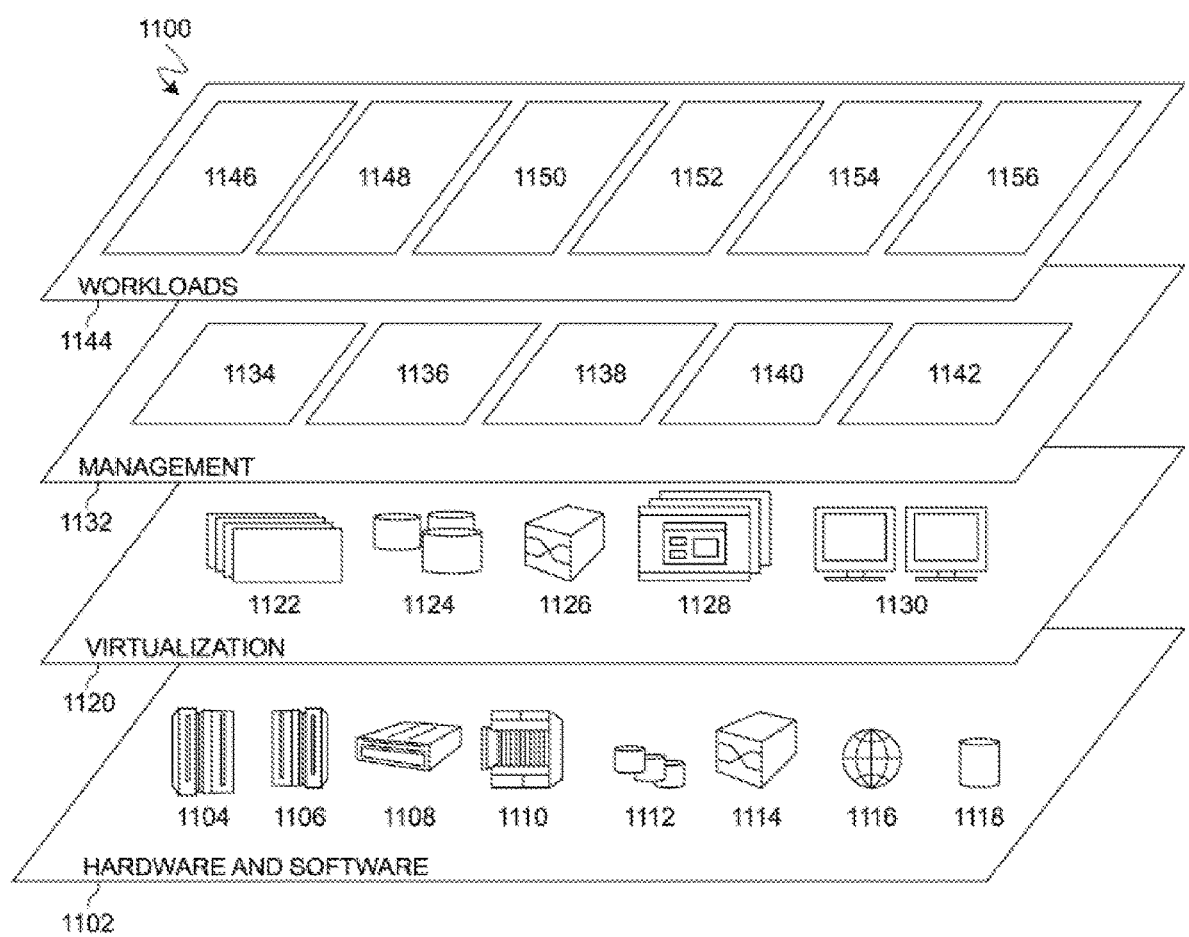
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and inventory management 1156. A inventory management program 110a, 110b provides a way to analyze customer interactions with retail staff at physical retail locations to enable merchandisers to recognize customer requested products and items that may not be in the merchandiser inventory or catalog of products.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for voice activated inventory management, the method comprising:
   recording an audio feed of a conversation between a customer and a staff, wherein the recorded audio feed includes a customer product query from the customer and a staff response associated with the customer product query from the staff;
   identifying a product requested by the customer in the customer product query;

identifying an inventory status in the staff response associated with the customer product query;

determining that a negative inventory status trigger is detected in the identified inventory status associated with the identified product requested by the customer; and in response to determining that the negative inventory status trigger is detected in the identified inventory status associated with the identified product requested by the customer, storing, in an inventory database, a plurality of customer query data associated with the identified product requested by the customer.

2. The method of claim 1, further comprising:

analyzing, using natural language processing, the customer product query in the recorded audio feed of the conversation between the customer and the staff; and analyzing, using natural language processing, the staff response in the recorded audio feed of the conversation between the customer and the staff.

3. The method of claim 1, further comprising:

in response to detecting a wake trigger in the conversation between the customer and the staff, performing a data collection event, wherein the performed data collection event includes recording a plurality of customer query metadata associated with the recorded audio feed of the conversation between the customer and the staff.

4. The method of claim 1, further comprising:

monitoring, using at least one voice recording device, an audio environment of a physical retail location associated with the conversation between the customer and the staff;

in response to receiving, using the at least one voice recording device, at least one phrase from the monitored audio environment of the physical retail location indicative of the customer product query, determining that a wake trigger is detected in the audio feed of the conversation between the customer and the staff; and in response to determining that the wake trigger is detected in the audio feed of the conversation between the customer and the staff, performing, using the at least one voice recording device, a data collection event.

5. The method of claim 1, wherein determining that the negative inventory status trigger is detected in the identified inventory status associated with the identified product requested by the customer further comprises determining that the identified product requested by the customer is unavailable for sale at a physical retail location associated with the conversation between the customer and the staff.

6. The method of claim 1, wherein the stored plurality of customer query data associated with the identified product requested by the customer is selected from the group consisting of: a geographic location of a physical retail location associated with the conversation between the customer and the staff, a time stamp associated with the recorded conversation between the customer and the staff at the physical retail location associated with the conversation between the customer and the staff, and the identified product requested by the customer, wherein the identified product requested by the customer is unavailable for sale at the physical retail location associated with the conversation between the customer and the staff.

7. The method of claim 5, further comprising:

providing a user with access to the inventory database including the stored plurality of customer query data associated with the identified product requested by the customer; and indicating, in the inventory database, that the determined product requested by the customer is unavailable for sale at the physical retail location associated with the conversation between the customer and the staff.

8. A computer system for voice activated inventory management, comprising:

one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

recording an audio feed of a conversation between a customer and a staff, wherein the recorded audio feed includes a customer product query from the customer and a staff response associated with the customer product query from the staff;

identifying a product requested by the customer in the customer product query;

identifying an inventory status in the staff response associated with the customer product query;

determining that a negative inventory status trigger is detected in the identified inventory status associated with the identified product requested by the customer; and in response to determining that the negative inventory status trigger is detected in the identified inventory status associated with the identified product requested by the customer, storing, in an inventory database, a plurality of customer query data associated with the identified product requested by the customer.

9. The computer system of claim 8, further comprising:

analyzing, using natural language processing, the customer product query in the recorded audio feed of the conversation between the customer and the staff; and analyzing, using natural language processing, the staff response in the recorded audio feed of the conversation between the customer and the staff.

10. The computer system of claim 8, further comprising:

in response to detecting a wake trigger in the conversation between the customer and the staff, performing a data collection event, wherein the performed data collection event includes recording a plurality of customer query metadata associated with the recorded audio feed of the conversation between the customer and the staff.

11. The computer system of claim 8, further comprising:

monitoring, using at least one voice recording device, an audio environment of a physical retail location associated with the conversation between the customer and the staff;

in response to receiving, using the at least one voice recording device, at least one phrase from the monitored audio environment of the physical retail location indicative of the customer product query, determining that a wake trigger is detected in the audio feed of the conversation between the customer and the staff; and in response to determining that the wake trigger is detected in the audio feed of the conversation between the customer and the staff, performing, using the at least one voice recording device, a data collection event.

12. The computer system of claim 8, wherein determining that the negative inventory status trigger is detected in the identified inventory status associated with the identified product requested by the customer further comprises determining that the identified product requested by the customer is unavailable for sale at a physical retail location associated with the conversation between the customer and the staff.

13. The computer system of claim 8, wherein the stored plurality of customer query data associated with the identified product requested by the customer is selected from the group consisting of: a geographic location of a physical retail location associated with the conversation between the customer and the staff, a time stamp associated with the recorded conversation between the customer and the staff at the physical retail location associated with the conversation between the customer and the staff, and the identified product requested by the customer, wherein the identified product requested by the customer is unavailable for sale at the physical retail location associated with the conversation between the customer and the staff.

14. The computer system of claim 12, further comprising:
providing a user with access to the inventory database including the stored plurality of customer query data associated with the identified product requested by the customer; and
indicating, in the inventory database, that the determined product requested by the customer is unavailable for sale at the physical retail location associated with the conversation between the customer and the staff.

15. A computer program product for voice activated inventory management, comprising:
one or more computer-readable tangible storage media and program instructions stored on at least one of the one or more computer-readable tangible storage media, the program instructions executable by a processor to cause the processor to perform a method comprising:
recording an audio feed of a conversation between a customer and a staff, wherein the recorded audio feed includes a customer product query from the customer and a staff response associated with the customer product query from the staff;
identifying a product requested by the customer in the customer product query;
identifying an inventory status in the staff response associated with the customer product query;
determining that a negative inventory status trigger is detected in the identified inventory status associated with the identified product requested by the customer; and
in response to determining that the negative inventory status trigger is detected in the identified inventory status associated with the identified product requested by the customer, storing, in an inventory database, a plurality of customer query data associated with the identified product requested by the customer.

16. The computer program product of claim 15, further comprising:
analyzing, using natural language processing, the customer product query in the recorded audio feed of the conversation between the customer and the staff; and
analyzing, using natural language processing, the staff response in the recorded audio feed of the conversation between the customer and the staff.

17. The computer program product of claim 15, further comprising:
in response to detecting a wake trigger in the conversation between the customer and the staff, performing a data collection event, wherein the performed data collection event includes recording a plurality of customer query metadata associated with the recorded audio feed of the conversation between the customer and the staff.

18. The computer program product of claim 15, further comprising:
monitoring, using at least one voice recording device, an audio environment of a physical retail location associated with the conversation between the customer and the staff;
in response to receiving, using the at least one voice recording device, at least one phrase from the monitored audio environment of the physical retail location indicative of the customer product query, determining that a wake trigger is detected in the audio feed of the conversation between the customer and the staff; and
in response to determining that the wake trigger is detected in the audio feed of the conversation between the customer and the staff, performing, using the at least one voice recording device, a data collection event.

19. The computer program product of claim 15, wherein determining that the negative inventory status trigger is detected in the identified inventory status associated with the identified product requested by the customer further comprises determining that the identified product requested by the customer is unavailable for sale at a physical retail location associated with the conversation between the customer and the staff.

20. The computer program product of claim 19, further comprising:
providing a user with access to the inventory database including the stored plurality of customer query data associated with the identified product requested by the customer; and
indicating, in the inventory database, that the determined product requested by the customer is unavailable for sale at the physical retail location associated with the conversation between the customer and the staff.

* * * * *